US011492535B1

(12) United States Patent
Benkley et al.

(10) Patent No.: US 11,492,535 B1
(45) Date of Patent: Nov. 8, 2022

(54) EVALUATING THE PRESENCE OF RESIN CEMENT

(71) Applicant: Halliburton Energy Services, Inc., Houston, TX (US)

(72) Inventors: James Robert Benkley, Duncan, TX (US); Paul J. Jones, Houston, TX (US); Samuel Lewis, Artesia, CA (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/537,135

(22) Filed: Nov. 29, 2021

(51) Int. Cl.
*C09K 8/44* (2006.01)
*E21B 33/14* (2006.01)

(52) U.S. Cl.
CPC ............... *C09K 8/44* (2013.01); *E21B 33/14* (2013.01)

(58) Field of Classification Search
CPC ................................ E21B 43/26; G01V 5/101
See application file for complete search history.

(56) References Cited

U.S. PATENT DOCUMENTS

| | | | | |
|---|---|---|---|---|
| 4,052,613 A * | 10/1977 | Murphy | ................. | G01V 5/108 250/259 |
| 8,100,177 B2 | 1/2012 | Smith, Jr. et al. | | |
| 8,555,967 B2 | 10/2013 | Chatterji et al. | | |
| 2004/0194961 A1 * | 10/2004 | Nguyen | ................. | E21B 43/025 166/295 |
| 2011/0277996 A1 * | 11/2011 | Cullick | ................... | E21B 43/16 166/250.12 |
| 2016/0075937 A1 * | 3/2016 | Cannan | .................... | C09K 8/80 166/250.1 |
| 2020/0017748 A1 * | 1/2020 | Hu | ........................ | E21B 33/134 |
| 2020/0283678 A1 * | 9/2020 | Ogle | ........................ | C09K 8/88 |

* cited by examiner

*Primary Examiner* — William D Hutton, Jr.
*Assistant Examiner* — Avi T Skaist
(74) *Attorney, Agent, or Firm* — Thomas Rooney; C. Tumey Law Group PLLC

(57) ABSTRACT

A method may include introducing a resin treatment fluid into a wellbore, the resin treatment fluid including a resin, a hardening agent, and a neutron contrasting agent; and allowing the resin treatment fluid to set to form a hardened mass.

20 Claims, 5 Drawing Sheets

EVALUATING THE PRESENCE OF RESIN CEMENT

BACKGROUND

Resin treatment fluids may be used in a variety of underground and subterranean applications. A resin treatment fluid may be placed in an annular space formed between a conduit and a wellbore and cured thereby supporting the conduit in the wellbore. Resin treatment fluids may be used in cement slurries for primary and remedial wellbore cementing to impart desirable properties to the set cement such as increased flexibility and toughness as compared to conventional cement compositions. Resin treatment fluids may be used in applications where increased stresses and/or increased number of stress cycles may be encountered. Injection wells are used to place fluids underground into porous geologic formations. The injected fluids may include by products from industry such as water, brines, wastewater, and chemicals. Injection wells are subject to cyclical hydraulic and thermal stress along with increased corrosion from injected fluids. For these reasons, resin treatment fluids are often used in constructing injection wells as the cured resin has better long-term durability than cement. Injection wells are usually subject to regulatory scrutiny which may include specifying materials and construction methods to ensure the long-term safety of the injection well.

For regulatory requirements, well integrity assurance, and safety reasons, logging data is used to confirm the presence and assess the quality of the protective sheath behind pipe over an interval of interest. Sonic logging tools emit acoustic, sonic, or ultra-sonic signals which interact with at least the wellbore cement to provide information regarding the quality and location of the cement behind pipe. The data generated from the logging tool may be aggregated to form a cement bond log (CBL). Cement slurries are a heterogenous mixture of particulates which set to achieve one or more desired mechanical properties. If a cement is present behind pipe, the log response may comprise of a multitude of squiggles corresponding to the heterogeneous particles of the cement. The logging response in a section of the wellbore where cement is not present may provide a flat, or straight-line response. As such, it may be straight forward to utilize CBL responses to determine whether or not there is cement behind pipe with traditional cement. Resin treatment fluids and cement slurries which contain resin treatment fluids are challenging to identify on a cement bond log due to the homogenous three-dimensional structure of the cured polymer which results in a flat or straight-line response, similar to the response from an unbonded section of pipe. Thus, it may be difficult to determine if a resin treatment fluid was placed in the desired place in a wellbore.

BRIEF DESCRIPTION OF THE DRAWINGS

These drawings illustrate certain aspects of some of the embodiments of the present disclosure, and should not be used to limit or define the disclosure.

DETAILED DESCRIPTION

Figure 1:
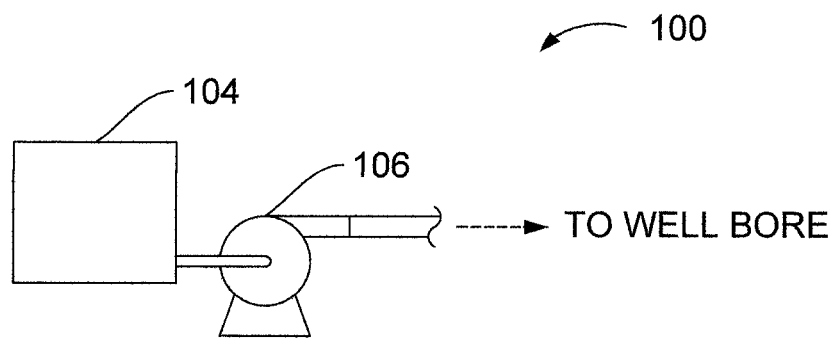
FIG. 1 is a schematic illustration of an example system for the preparation and delivery of a resin treatment fluid into a wellbore.

The present disclosure may relate to resin treatment fluids, and more particularly to resin treatment fluids containing a neutron contrasting agent. Resin treatment fluids may include a liquid hardenable resin, a hardener, and neutron contrasting agent. The resin treatment fluid may be introduced into a wellbore and allowed to set to form a hardened mass. The hardened mass may function in a multitude of capacities including operating as a primary protective sheath in the annular space disposed between the outer diameter of the casing and the interface of the wellbore, providing local or zonal isolation to annular portions where remediation is required, or provide isolation in any other portion of the wellbore. The neutron contrasting agent may provide a signal to a logging tool such as an acoustic tool or a nuclear tool which may then be used to confirm the placement of the resin in the desired portion of the wellbore.

As used herein, the term "resin" may refer to any of a number of physically similar polymerized synthetics or chemically modified natural resins including thermoplastic materials and thermosetting materials. In some examples, resins may be liquid hardenable resins which may include, but are not limited to, epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, bisphenol A diglycidyl ether resins, butoxymethyl butyl glycidyl ether resins, bisphenol A-epichlorohydrin resins, bisphenol F resins, diglycidyl ether bisphenol F resin, cyclohexane dimethanol diglycidyl ether, glycidyl ether resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped downhole, they may be cured using only time and temperature. Other suitable resins, such as furan resins generally require a time-delayed catalyst or an external catalyst to help activate the polymerization of the resins if the cure temperature is low (i.e., less than 250° F. (121° C.), but will cure under the effect of time and temperature if the formation temperature is above about 250° F.

Selection of a particular resin may be affected by the temperature of the subterranean formation to which the resin treatment fluid will be introduced. By way of example, for subterranean formations having a bottom hole static temperature ("BHST") ranging from about 60° F. to about 400° F., two-component epoxy-based resins comprising a liquid hardenable resin component and a hardener may be used. Generally, the liquid hardenable resin may be included in the resin treatment fluid in an amount in a range of from about 5% to about 100% by volume of the liquid hardenable resin component. In some examples, the liquid hardenable resin may be included in the liquid hardenable resin component in an amount in a range of from about 75% to about 100% by volume of the liquid hardenable resin component or from about 90% to about 100% by volume of the liquid hardenable resin component. In some embodiments, the liquid hardenable resins may be included in the resin treatment fluids at a point in a range of from about 50% to about 99% by volume of the resin treatment fluid. Alternatively, from about 50% to about 60% by volume, about 60% to about 70% by volume, about 70% to about 80% by volume, about 80% to about 90% by volume, about 90% to about 99% by volume, or any ranges therebetween.

As used herein, the term "hardener" or "hardening agent" may refer to any substance capable of transforming the liquid hardenable resin into a hardened, consolidated mass. Examples of suitable hardening agents may include, but are not limited to, aliphatic amines, aliphatic tertiary amines, aromatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, N-aminophenyl piperazine, imidazoline, 1,2-diaminocyclohexane, polyetheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and combinations thereof. Examples of commercially available hardening agents may include, but are not limited to, combinations of hardeners such as 75%-81% 3,5-diethyltoluene-2,4-diamine, 18%-20% 3,5-diethyltoluene-2,6-diamine, and 0.5%-3% dialkylated m-phenylenediamines. In some embodiments the hardening agent may comprise a mixture of hardening agents selected to impart particular qualities to the resin treatment fluid. In some embodiments, the hardening agents may be included in the resin treatment fluid at a point in a range of from about 1% to about 50% by volume of the resin treatment fluid. Alternatively, from about 1% to about 10% by volume, about 10% to about 20% by volume, about 20% to about 30% by volume, about 4% to about 50% by volume, or any ranges therebetween.

Resin treatment fluids may include a resin that can undergo a ring-opening metathesis polymerization (ROMP) reaction. Resin molecules that undergo ROMP may polymerize by forming new carbon-carbon bonds between molecules. Once the polymerization reaction is initiated, the reaction may proceed rapidly to transform the resin treatment fluid from a liquid to a solid. During the reaction, heat may be released, which may raise the temperature of the resin treatment fluid, however, the heat generated may not be sufficient to char or degrade the final hardened mass. The resin in the resin treatment fluid may be pumpable below 38° C. (100° F.) without additional solvents present. Further, the resin may have a density greater than water and a viscosity that may be ideal for deep penetration into channels and efficient squeezes for defects such as gas migration or casing leaks.

The resin included in the resin treatment fluid may include a cycloalkene, which may be a cycloalkadiene, that may undergo a ring-opening metathesis polymerization reaction transforming the resin treatment fluid into a hardened mass. The cycloalkene may have no aromatic character. The cycloalkene may include, but is not limited to, cyclopentadiene, dicyclopentadiene, tricyclopentadiene, cyclobutadiene, cyclohexadiene, terpinene, norbornadiene, isomers thereof, and combinations thereof. The cycloalkene may also be substituted or unsubstituted cycloalkadienes. Substituted cycloalkadienes may be substituted with a hydrocarbyl group or any other suitable organic functional group. The cycloalkene may be present at a point in a range of about 50 wt. % to about 99.5 wt. % of the resin treatment fluid. Alternatively, the cycloalkene may be present at a point in a range of about 50 wt. % to about 60 wt. %, at a point in a range of about 60 wt. % to about 70 wt. %, at a point in a range of about 70 wt. % to about 80 wt. %, at a point in a range of about 80 wt. % to about 90 wt. %, at a point in a range of about 90 wt. % to about 99.5 wt. %. or any ranges therebetween.

The resin treatment fluids may include a transition metal compound catalyst where the transition metal compound catalyst may include a substituted or unsubstituted metal carbene compound comprising a transition metal and an organic backbone. Some non-limiting examples of the transition metal compound catalyst may include, but are not limited to a Grubbs Catalyst® and Schrock catalysts. The Grubbs Catalyst® may include ruthenium alkylidene or osmium alkylidene and Schrock catalyst may include molybdenum. Selection of a transition metal compound catalyst may affect the polymerization rate. The transition metal compound catalyst may be present in the resin treatment fluid at a point in a range of about 0.001 wt. % to about 20 wt. %. Alternatively, the transition metal compound catalyst may be present at a point in a range of about 0.001 wt. % to about 1 wt. %, at a point in a range of about 1 wt. % to about 5 wt. %, at a point in a range of about 5 wt. % to about 10 wt. %, at a point in a range of about 10 wt. % to about 15 wt. %, at a point in a range of about 15 wt. % to about 20 wt. %, or any ranges therebetween. Alternatively, the resin and the transition metal compound catalyst concentrations may be expressed as relative mass ratios. For example, the resin and the transition metal compound catalyst may be present in the resin treatment fluid in a mass ratio of about 50:1 to about 10000:1 resin to transition metal compound catalyst. Alternatively, the resin and transition metal compound catalyst may also be present in mass ratios of about 50:1 to about 100:1, about 100:1 to about 500:1, about 500:1 to about 1000:1, about 1000:1 to about 2000:1, about to 2000:1 to about 3000:1, about 3000:1 to about 4000:1, about 4000:1 to about 5000:1, about 5000:1 to about 6000:1, about 6000:1 to about 7000:1, about 7000:1 to about 8000:1, about 8000:1 to about 9000:1, about 9000:1 to about 10000:1 or any mass ratios therebetween of the resin to the transition metal compound catalyst. Alternatively, the transition metal compound catalyst may be suspended in a mineral oil suspension, or any suitable suspension medium. For example, the suspension medium may be present in the transition metal compound catalyst suspension in an amount of about 90% to 99% of the transition metal compound catalyst suspension. Alternatively, the suspension medium may be present in amount of about 90% to about 92%, about 93% to about 95%, and about 96% to about 99%. The resin and the transition metal compound catalyst suspension concentrations may be expressed as relative mass ratios. For example, the resin and the transition metal compound catalyst suspension may be present in the resin treatment fluid in a mass ratio of about 50:1 resin to transition metal compound catalyst suspension. Alternatively, the resin and transition metal compound catalyst suspension may also be present in mass ratios of about 20:1, about 30:1, about 40:1, about 60:1, about 70:1, or about 80:1, or any mass ratios therebetween of the resin to the transition metal compound catalyst suspension. Specific examples of suitable transition metal compound catalysts will be described in detail below.

The transition metal compound catalyst may have the general chemical structure depicted in Structure 1. M may be either ruthenium or osmium. R and R1 may be independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl. The selected R and R1 may be optionally substituted with C1-C5 alkyl, halogen, C1-C5 alkoxy or with a phenyl group further optionally substituted with halogen, C1-C5 alkyl or C1-C5 alkoxy. X and X1 may be the same or different and may be any suitable anionic ligand. L and L1 may any suitable neutral electron donor.

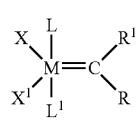

Structure 1

The transition metal compound catalyst may also have the general chemical structure depicted in Structure 2. M may be either ruthenium or osmium. R and R1 may be independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl. The selected R and R1 may optionally be substituted with C1-C5 alkyl, halogen, C1-C5 alkoxy or with a phenyl group further optionally substituted with halogen, C1-C5 alkyl or C1-C5 alkoxy. X and X1 groups may be the same or different and may be any suitable anionic ligand. L2, L3, and L4 may be the same or different, and may be any suitable neutral electron donor ligand, wherein at least one L2, L3, and L4 may be an N-heterocyclic (NHC) carbene ligand as described below.

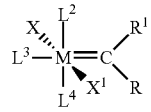

Structure 2

The transition metal compound catalyst may also have the general chemical structure depicted in Structure 3. M may be either ruthenium or osmium. R and R1 may be independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl. The selected R and R1 may optionally be substituted with C1-C5 alkyl, halogen, C1-C5 alkoxy or with a phenyl group further optionally substituted with halogen, C1-C5 alkyl or C1-C5 alkoxy. X and X1 may be the same or different and may be any suitable anionic ligand. NHC may be any N-heterocyclic carbene (NHC) ligand as described below.

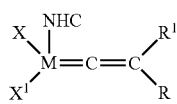

Structure 3

The transition metal compound catalyst may also have the general chemical structure depicted in Structure 4. M may be either ruthenium or osmium. R and R1 may be independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl. The selected R and R1 may optionally be substituted with C1-C5 alkyl, halogen, C1-C5 alkoxy or with a phenyl group further optionally substituted with halogen, C1-C5 alkyl or C1-C5 alkoxy. X and X1 may be the same or different and may be any suitable anionic ligand. NHC may be any N-heterocyclic carbene (NHC) ligand as described below.

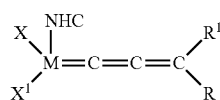

Structure 4

The transition metal compound catalysts of Structures 2-4 may further include an N-heterocyclic carbene (NHC) ligand. The NHC ligands may include 4-membered NHC and 5-membered NHC where the NHC ligand may attach to one coordination site of the transition metal compound catalyst. Structures 5-9 are exemplary structures of NHC ligands.

The NHC ligand may be a 4-membered N-heterocyclic carbene ligand. An exemplary structure of 4-membered carbene ligand is depicted in Structure 5. In the following structure, iPr is an isopropyl group.

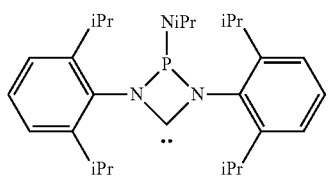

Structure 5

The NHC ligand may also be a 5-membered N-heterocyclic carbene ligand. An exemplary structure of 5-membered carbene ligands is depicted in Structure 6 and Structure 7. $R^1$ and $R^2$ may be independently selected from 2,4,6-(Me)3C6H2, 2,6-(iPr)2C6H3, cyclohexyl, tert-butyl, 1-adamantyl.

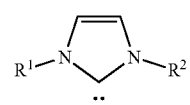

Structure 6

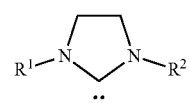

Structure 7

The NHC ligand may be a 5-membered N-heterocyclic carbene ligand. Another exemplary structure of a 5-membered carbene ligand is depicted in Structure 8. $R^1$ and $R^2$ may be equivalent groups and may be selected from $(CH_2)_n$ where n may be 4-7 and 12.

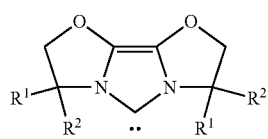

Structure 8

The NHC ligand may be a 5-membered N-heterocyclic carbene ligand. An exemplary structure of 5-membered carbene ligand is depicted in Structure 9. R may be selected between hydrogen and tert-butyl.

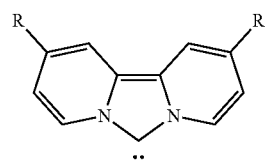

Structure 9

As mentioned above, the resin treatment fluid may include a neutron contrasting agent such that the resin placement may be detected using a logging tool. Neutron contrasting agents may comprise relatively inert hard materials and/or also materials that are thermal neutron absorbing materials. Thermal neutron absorbing materials may comprise any element which has a thermal neutron absorbing capability of a magnitude such that differences in the backscattered thermal neutrons before and after a resin treatment fluid is introduced into a well bore can be detected. Some exemplary neutron contrasting agents may include, but are not limited to, boron carbide, boron nitride, boric acid, borosilicate glass, zinc borate, borax, gadolinium, gadolinium oxide, gadolinium acetate, gadolinium concentrated glass, cadmium hydroxide, and combinations thereof. Multiple neutron contrasting agents may be used in a single application and in combination with other contrasting agents. The neutron contrasting agents may comprise any regular or irregular geometry such as, for example, flakes, toroids, pellets, beads, spheres, fibers, rods, platelets, disks, plates, ribbons, or cubes, for example. The solid particles may comprise any average particle size for a particular application. For example, the neutron contrasting agents may have an average particle size in the range of about 100 nm to about 500 microns. Alternatively, the solid particles may have an average particle size in the range of about 100 nm to about 500 nm, about 500 nm to about 1 micron, about 1 micron to about 100 micron, about 100 micron to about 250 micron, or about 250 micron to about 500 micron. The neutron contrasting agent may be included in any amount in the resin treatment fluid such that differences in the backscattered thermal neutrons before and after a resin treatment fluid is introduced into a well bore can be detected. For example, the neutron contrasting agent may be included in the resin treatment fluid in an amount of about 0.0001% to about 1% by mass of resin treatment fluid depending on the formation through which the wellbore extends. Alternatively, the neutron contrasting agent may be included in an amount of about 0.0001% to about 0.001% by mass, about 0.01% to about 0.1% by mass, about 0.1% to about 1% by mass, or any ranges therebetween.

Resin treatment fluids may experience rheological instability over the duration of the placement period which may include settling of the solid neutron contrasting agent from the bulk resin treatment fluid. Rheological modifiers may be utilized to help suspend the solid neutron contrasting agent including, without limitation, polymeric additives, organophilically modified clay, bentonite, diatomaceous earth, gilsonite, scleroglucan, carragenans, xanthan, welan, diutan gums, celluloses, hydroxyl ethyl celluloses, acrylamide polymers, acrylic acid-acrylamide co-polymers, acrylamide co-polymers, and combinations thereof. The suspension additives may be included in any suitable amount, including at a point in a range of from about 0.1% to about 5% by volume of the resin treatment fluid. Alternatively, from about 0.1% to about 1% by volume, about 1% to about 3% by volume, about 3% to about 5% by volume, or any ranges therebetween.

Organophilically modified clay may be any clay that has a hydrophilic character (e.g., an at least partially hydrophilic clay or a hydrophilic clay). The organophilically-modified clay may be present in the resin treatment fluid at a concentration such that the resin treatment fluid has a higher yield point than a corresponding resin treatment fluid having substantially none of the organophilically-modified clay therein. Any suitable proportion of the resin treatment fluid may include the organophilically-modified clay, such as about 0.01 wt % to about 50 wt % of the resin treatment fluid, about 0.01 wt % to about 0.1 wt %, about 0.1 wt % to about 1 wt %, about 1 wt % to about 10 wt %, about 10 wt % to about 20 wt %, about 20 wt % to about 30 wt %, about 30 wt % to about 40 wt %, about 40 wt % to about 50 wt %, or any ranges therebetween. The organophilically-modified clay may include any suitable one or more clays. For example, the organophilically-modified clay may include at least one of a kaolinite (e.g., kaolinite, nacrite, dickite, and halloysite), montmorillonite (e.g., montmorillonite, montmorillonite-smectite, bentonite, saponite, nontronite, hectorite, or sauconite), an illite (e.g., illite, hydrobiotite, glauconite, bramallite), and chlorite (e.g., chlorite or chamosite). The organophilically-modified clay can include vermiculite, attapulgite, or sepiolite. Other mineral components may further be associated with the clay. In some embodiments, the organophilically-modified clay includes montmorillonite. The organophilic-modification of the clay may be any suitable organophilic modification that renders the clay more hydrophilic than a corresponding clay not having the organophilic modification or having less of the organophilic modification. The organophilic modification may be a surface modification, or may be a modification that occurs in non-surface regions. The organophilic modification may be an ion exchange with cationic surfactants having hydrophobic or organophilic groups. The organophilic modification may be an electrostatic attachment of the surfactant. The organophilic modification may be at least one of cationic substitution, physisorption (e.g., substantially no change in bonds), and chemisorption (e.g., change in bonds). A cation may replace other cations in the clay to form the organophilic modification. An anion may coordinate to one or more cations in the clay to form the organophilic modification.

The organophilically-modified clay may include at least one organophilic-modification compound or an ion thereof (e.g., the organophilic modification compound is a salt or a pair of ions that form a charge-neutral compound and the clay includes at least one ion from the salt). The at least one organophilic-modification compound or ion thereof may be any suitable proportion of the organophilically-modified clay, such as about 0.01 wt % to about 80 wt % of the organophilically-modified clay, or about 0.01 wt % to about 0.1 wt %, about 0.1 wt % to about 1 wt %, about 1 wt % to about 10 wt %, about 10 wt % to about 20 wt %, about 20 wt % to about 30 wt %, about 30 wt % to about 40 wt %, about 40 wt % to about 50 wt %, about 50 wt % to about 60 wt %, about 60 wt % to about 70 wt %, about 70 wt % to about 80 wt %.

In various embodiments, the organophilic-modification compound is at least one of a substituted or unsubstituted (C10-C50) fatty acid or a salt thereof, a tri- or tetra-(C1-C50)hydrocarbylammonium salt, and a tri- or tetra-(C1-C50)hydrocarbylphosphonium salt, wherein each (C1-C50) hydrocarbyl is independently selected, is substituted or unsubstituted, and is interrupted by 0, 1, 2, or 3 atoms chosen from —O—, —S—, and substituted or unsubstituted —NH—.

The organophilic-modification compound may include a (C10-C50) fatty acid salt, such as magnesium stearate and zinc stearate. The organophilic-modification compound may include at least one of a tri- or tetra-(C1-C50)hydrocarbylammonium salt, and a tri- or tetra-(C1-C50)alkyl- or alkenylphosphonium salt, wherein each (C1-C50)hydrocarbyl is independently selected. The organophilic-modification compound may include at least one of a trimethyl stearyl ammonium salt, dodecyltrimethylammonium bromide, hexadecyltrimethylammonium bromide, tetradecyltrimethylammonium bromide, and tetraphenylphosphonium bromide.

In some examples, a solvent may be added to the resin treatment fluid to reduce its viscosity for ease of handling, mixing and transferring. Generally, any solvent that is compatible with the hardenable resin and that achieves the desired viscosity effect may be suitable for use in the liquid hardenable resin component of the resin treatment fluid. Suitable solvents may include, but are not limited to, polyethylene glycol, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters, and combinations thereof. Selection of an appropriate solvent may be dependent on the hardenable resin chosen. In some examples, the amount of the solvent used in the liquid hardenable resin component may be in the range of about 0.1% to about 30% by volume of the liquid hardenable resin component. Alternatively, the solvent may be present in an amount of about 0.1% to about 10%, about 10% to about 20%, or about 20% to about 30% by volume of the liquid hardenable resin component. Alternatively, the liquid hardenable resin component may be heated to reduce its viscosity, in place of, or in addition to, using a solvent.

The resin treatment fluid may further include a silane coupling agent. The silane coupling agent may be used, among other things, to act as a mediator to help bond the resin to the surface of the subterranean formation, and/or the surface of the wellbore. Examples of suitable silane coupling agents include, but are not limited to, N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilanes; aminoethyl-N-beta-(aminoethyl)-gamma-aminopropyl-trimethoxysilanes; gamma-ureidopropyl-triethoxysilanes; beta-(3-4 epoxy-cyclohexyl)-ethyl-trimethoxysilane; gamma-glycidoxypropyltrimethoxysilanes; vinyltrichlorosilane; vinyltris (beta-methoxyethoxy) silane; vinyltriethoxysilane; vinyltrimethoxysilane; 3-metacryloxypropylt-rimethoxysilane; beta-(3,4 epoxycyclohexyl)-ethyltrimethoxysilane; r-glycidoxypropyltrimethoxysilane; r-glycidoxypropylmethylidiethoxysilane; N-beta-(aminoethyl)-r-aminopropyl-trimethoxysilane; N-beta-(aminoethyl)-r-aminopropylmethyldimethoxysilane; 3-aminopropyl-triethoxysilane; N-phenyl-r-aminopropyltrimethoxysilane; r-mercaptopropyltrimethoxysilane; r-chloropropyltrimethoxysilane; vinyltrichlorosilane; vinyltri s (beta-methoxyethoxy) silane; vinyltrimethoxysilane; r-metacryloxypropyltrimethoxysilane; beta-(3,4 epoxycyclohexyl)-ethyltrimethoxysila; r-glycidoxypropyltrimethoxysilane; r-glycidoxypropylmethylidiethoxysilane; N-beta-(aminoethyl)-r-aminopropyltrimethoxysilane; N-beta-(aminoethyl)-r-aminopropylmethyldimethoxysilane; r-aminopropyltriethoxysilane; N-phenyl-r-aminopropyltrimethoxysilane; r-mercaptopropyltrimethoxysilane; r-chloropropyltrimethoxysilane; N[3-(trimethoxysilyl)propyl]-ethylenediamine; substituted silanes where one or more of the substitutions contains a different functional group; and combinations thereof. The silane coupling agent may be included in the liquid hardenable resin component or as a component of the solid resin accelerator.

The resin treatment fluid may be utilized in a neat configuration whereby the resin treatment fluid primarily consists of the resin, the hardener, the neutron contrasting agent, and a solvent, if present, without substantial contamination, for example, about less than 5% by volume of other components. Alternatively, the resin treatment fluid may be included in a cement slurry as part of a primary or remedial wellbore cementing operation such that resin containing cement may be detected using a neutron tool. A variety of cements may be included in the resin treatment fluid, including cements comprised of calcium, aluminum, silicon, oxygen, and/or sulfur which set and harden by reaction with water. Such hydraulic cements may include Portland cements, pozzolan cements, gypsum cements, high alumina content cements, slag cements, high magnesia content cements, shale cements, acid/base cements, fly ash cements, zeolite cement systems, kiln dust cement systems, microfine cements, metakaolin cements, pumice/lime cements and their combinations. Portland cements that may be suited for use in examples of the present disclosure may be classified as Class A, B, C, D, E, F, G, H, K and L cements according to American Petroleum Institute, API Specification for Materials and Testing for Well Cements, API Specification 10A, Twenty-Fifth Ed., March, 2019. In addition, in some examples, hydraulic cements suitable for use in the present disclosure may be classified as ASTM Type I, II, or III. The cementitious materials may be combined with the aqueous base fluids to form a cement slurry which may be introduced into a wellbore penetrating a subterranean formation. The cement may be included in the resin treatment fluid in any suitable amount, including, but not limited to, about 20% to about 99% by weight of the cement. Suitable amounts may include, but are not limited to, 20%, 30%, 40%, 50%, 60, 70%, 80%, or 99% by weight of the cement.

In some examples, the resin treatment fluid may further comprise a weighting or filler material which increases or lowers the density of the resin treatment fluid. Examples of weighting materials may include, but are not limited to hollow microspheres, silica and alumina cenospheres, hollow glass microspheres, ceramic microspheres, polymeric microspheres, plastic microspheres, silica, ilmenite, hematite, barite, Portland cement, crystalline hematite, aluminum oxide, awaruite, barium carbonate, barium oxide, barite, calcium carbonate, calcium oxide, chromite, chromium oxide, copper, copper oxide, dolomite, galena, gold, hematite, a hollow glass microsphere, ilmenite, iron oxide, siderite, magnetite, magnesium oxide, manganese carbonate, manganese dioxide, manganese (IV) oxide, manganese oxide, manganese tetraoxide, manganese (II) oxide, manganese (III) oxide, molybdenum (IV) oxide, molybdenum oxide, molybdenum trioxide, Portland cement, pumice, pyrite, scheelite, silica, silver, tenorite, titania, titanium (II) oxide, titanium (III) oxide, titanium (IV) dioxide, zirconium oxide, zirconium silicate, zinc oxide, and combinations thereof. The weighting material may be included in the resin treatment fluid in an amount in a range of from about 1% to about 60% by volume of the resin treatment fluid. In particular examples, the weighting material may be included in the resin treatment fluid in an amount in a range of from about 20% to about 40% by volume of the resin treatment fluid.

The resin treatment fluid may set to have a desirable compressive strength. Compressive strength is generally the capacity of a material or structure to withstand axially directed pushing forces. The compressive strength may be measured at a specified time after preparation of the cement composition while the cement composition is maintained under specified temperature and pressure conditions. Compressive strength may be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ Ultrasonic Cement Analyzer, available from Fann™ Instrument Company, Houston, Tex. Compressive strength values may be determined in accordance with API RP 10B-2, *Recommended Practice for Testing Well Cements*, First Edition, July 2005.

By way of example, the resin treatment fluid may develop a 24-hour compressive strength in the range of from about 50 psi (about 3.5 bar) to about 12000 psi (about 827 bar), alternatively, from about 100 psi (about 6.9 bar) to about 4500 psi (about 310.3 bar), or alternatively from about 4500 psi (about 310.3 bar) to about 12000 psi (about 827 bar). Without limitation, the cement compositions may develop a compressive strength in 24 hours of at least about 4500 psi (310.3 bar), at least about 1000 psi (about 551.6 bar), at least about 12000 psi (about 827 bar), or more.

In some examples, the resin treatment fluid may have desirable thickening times. Thickening time typically may refer to the time a fluid, such as the cement composition, remains in a fluid state capable of being pumped. As used herein, the "thickening time" is how long it takes for a fluid to become unpumpable at a specified temperature and specified pressure. The pumpability of a resin treatment fluid is related to the consistency of the composition. The consistency of a fluids may be measured in Bearden units of consistency (Bc), a dimensionless unit with no direct conversion factor to the more common units of viscosity. As used herein, a composition becomes "unpumpable" when the consistency of the composition reaches 70 Bc. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The compositions may have thickening times greater than about 1 hour, alternatively, greater than about 2 hours, greater than about 15 hours, greater than about 30 hours, greater than about 100 hours, or alternatively greater than about 190 hours at 500 psi (about 3447 kPa) and temperatures in a range of from about 32° F. (about 0° C.) to about 300° F. (about 149° C.), alternatively, in a range of from about 100° F. (about 38° C.) to about 200° F. (about 93° C.), and alternatively at a temperature range from about 200° F. (about 93° C.) to about 300° F. (about 149° C.).

The resin treatment fluids of the present disclosure may be used in construction of injection wells where a cured resin is used to support a conduit in the injection well. In other examples, the resin treatment fluid may be introduced into a subterranean formation and allowed to harden. As used herein, introducing the resin treatment fluid into a subterranean formation includes introduction into any portion of the subterranean formation, including, without limitation, into a wellbore drilled into the subterranean formation, into a near wellbore region surrounding the wellbore, or into both. The resin treatment fluid may be allowed to harden in the subterranean formation for a number of purposes including, without limitation: to isolate the subterranean formation from a portion of the wellbore; to support a conduit in the wellbore; to plug a void in the conduit; plug a void in a cement sheath disposed in an annulus of the wellbore; to plug a perforation; to plug void (e.g., micro-annulus) between the cement sheath and the conduit; to prevent the loss of aqueous or nonaqueous drilling fluids into loss circulation zones such as a void, vugular zone, or fracture; to plug a well for abandonment purposes; to form a temporary plug to divert treatment fluids; as a chemical packer to be used as a fluid in front of cement slurry in cementing operations; or to seal an annulus between the wellbore and an expandable pipe or pipe string. For instance, the resin treatment fluid may withstand substantial amounts of pressure, e.g., the hydrostatic pressure of a drilling fluid or cement slurry, without being dislodged or extruded. The resin treatment fluid may set into a flexible, resilient and tough material, which may prevent further fluid losses when circulation is resumed. The resin treatment fluid may also form a non-flowing, intact mass inside the loss-circulation zone. This mass plugs the zone and inhibits loss of subsequently pumped drilling fluid, which allows for further drilling.

In primary-cementing examples, the resin treatment fluid may be introduced into a well-bore annulus such as a space between a wall of a wellbore and a conduit (e.g., pipe strings, liners) located in the wellbore or between the conduit and a larger conduit in the wellbore. The resin treatment fluid may be allowed to harden to form an annular sheath of the hardened composition in the well-bore annulus. Among other things, the hardened composition formed by the resin treatment fluid may form a barrier, preventing the migration of fluids in the wellbore. The hardened composition also may, for example, support the conduit in the wellbore and/or form a bond between the well-bore wall and the conduit.

In some examples, the conduit may also be cemented into a well-bore annulus by utilizing what is known as a reverse-cementing method. The reverse-cementing method comprises displacing the resin treatment fluid into the annulus between the conduit and the annulus between an existing string, or an open hole section of the wellbore. As the resin treatment fluid is pumped down the annular space, drilling fluids ahead of the resin treatment fluid are displaced around the lower ends of the conduit and up the inner diameter of the conduit and out at the surface. The fluids ahead of the resin treatment fluid may also be displaced upwardly through a work string that has been run into the inner diameter of the conduit and sealed off at its lower end. Because the work string has a smaller inner diameter, fluid velocities in the work string will be higher and will more efficiently transfer the cuttings washed out of the annulus during placement of the resin treatment fluid. In an example, a small amount of resin treatment fluid will be pumped into the conduit and the work string. As soon as a desired amount of resin treatment fluid has been pumped into the annulus, the work string may be pulled out of its seal receptacle and excess resin treatment fluid that has entered the work string may be reverse-circulated out the lower end of the work string to the surface.

In remedial-cementing examples, a resin treatment fluid may be used, for example, in squeeze-cementing operations or in the placement of cement plugs. By way of example, the resin treatment fluid may be placed in a wellbore to plug voids, such as holes or cracks in the pipe strings; holes, cracks, spaces, or channels in the sheath; and very small spaces (commonly referred to as "micro-annuli") between the sheath and the exterior surface of the pipe or well-bore wall.

The neutron contrasting agent may be provided in any suitable form such as a dry powder or as a suspension comprising the neutron contrasting agent and a carrier fluid. Alternatively, the neutron contrasting agent may be provided as a component of the liquid hardenable resin or the hardener. Depending on the operational requirements and equipment constraints, solid versions of the aforementioned resins, hardening agents, and accelerators may be used in the place of the liquid forms. In one embodiment, utilizing a solid chemistry for one or more of the aforementioned chemicals may provide operational benefits including simplified bulk material handling and ease of mixing the resin components. The components of the resin treatment fluid including the resin, the hardener, and the neutron contrasting agent may be mixed in a mixer, for example, in a downhole tub (DH) or a recirculating mixer tub (RCM) to form the resin treatment fluid, and may thereafter be pumped into a desired location within a wellbore.

FIG. 1 illustrates a system 100 for the preparation of a resin treatment fluid with one or more neutron contrasting agents and subsequent delivery of the resin treatment fluid to a wellbore in accordance with certain examples. As shown, the resin treatment fluid may be mixed in mixing equipment 104, such as a jet mixer, re-circulating mixer, or a batch mixer, for example, and then pumped via pumping equipment 106 to the wellbore. In some examples, the mixing equipment 104 and the pumping equipment 106 may be disposed on one or more pump trucks as will be apparent to those of ordinary skill in the art. A resin treatment fluid may be mixed by combing a resin and a hardener in mixing equipment 104 or in other mixing equipment. Once the resin treatment fluid is prepared, the neutron contrasting agents or other additives may be blended with the resin treatment fluid by slip-streaming the additives with the resin treatment fluid on a suction header on pumping equipment 106. Alternatively, the resin treatment fluid may be blended with the neutron contrasting agents in mixing equipment 104. Pumping equipment 106 may pump the resin treatment fluid to the wellbore.

Figure 2:
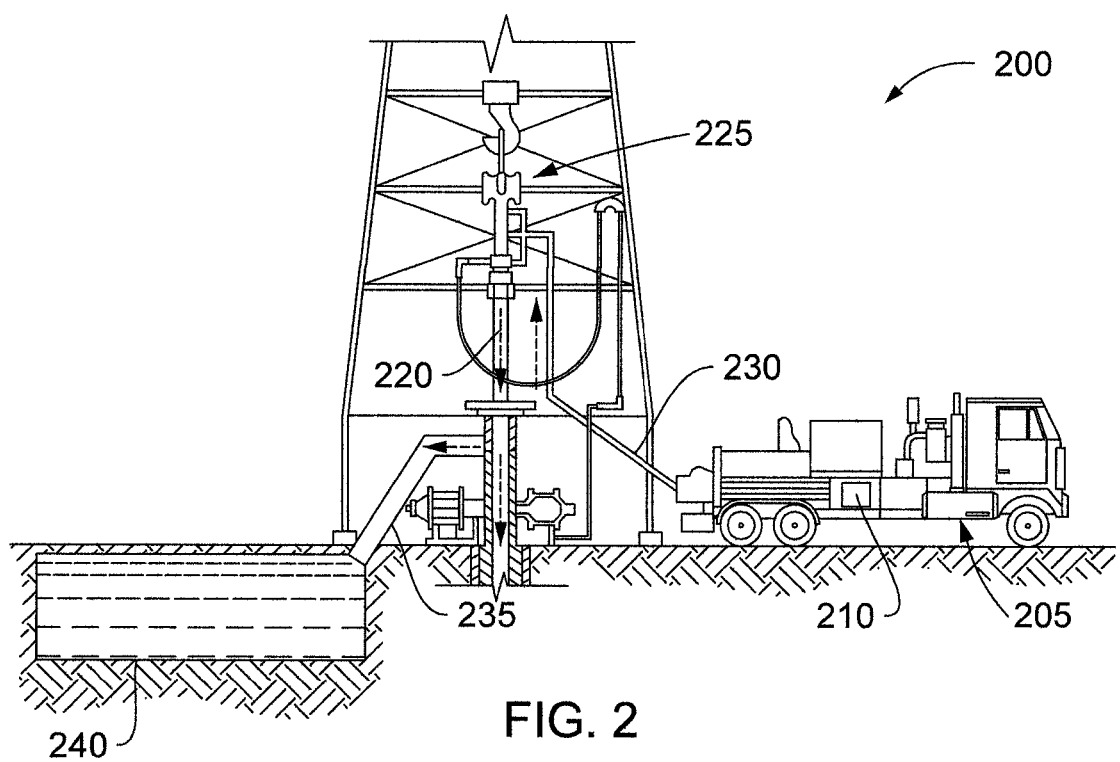
FIG. 2 is a schematic illustration of example surface equipment that may be used in the placement of a resin treatment fluid into a wellbore.

An example primary cementing technique using a resin treatment fluid will now be described with reference to FIGS. 2 and 3. FIG. 2 illustrates surface equipment 200 that may be used in the placement of a resin treatment fluid in accordance with certain examples. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 200 may include a pumping unit 205, which may include one or more trucks with mounted pumping and mixing equipment. The pumping unit 205 may include mixing equipment 210 and pumping equipment 215 (e.g., 106 in FIG. 1) as will be apparent to those of ordinary skill in the art. Pumping unit 205, or multiple pumping units 205, may pump a resin treatment fluid 220 through a feed pipe 230 and to a pumping head 225 which conveys the resin treatment fluid 220 downhole. Resin treatment fluid 220 may displace other fluids present in the wellbore, such as drilling fluids and spacer fluids, which may exit the wellbore through an annulus and flow through pipe 235 to mud pit 240.

Figure 3:
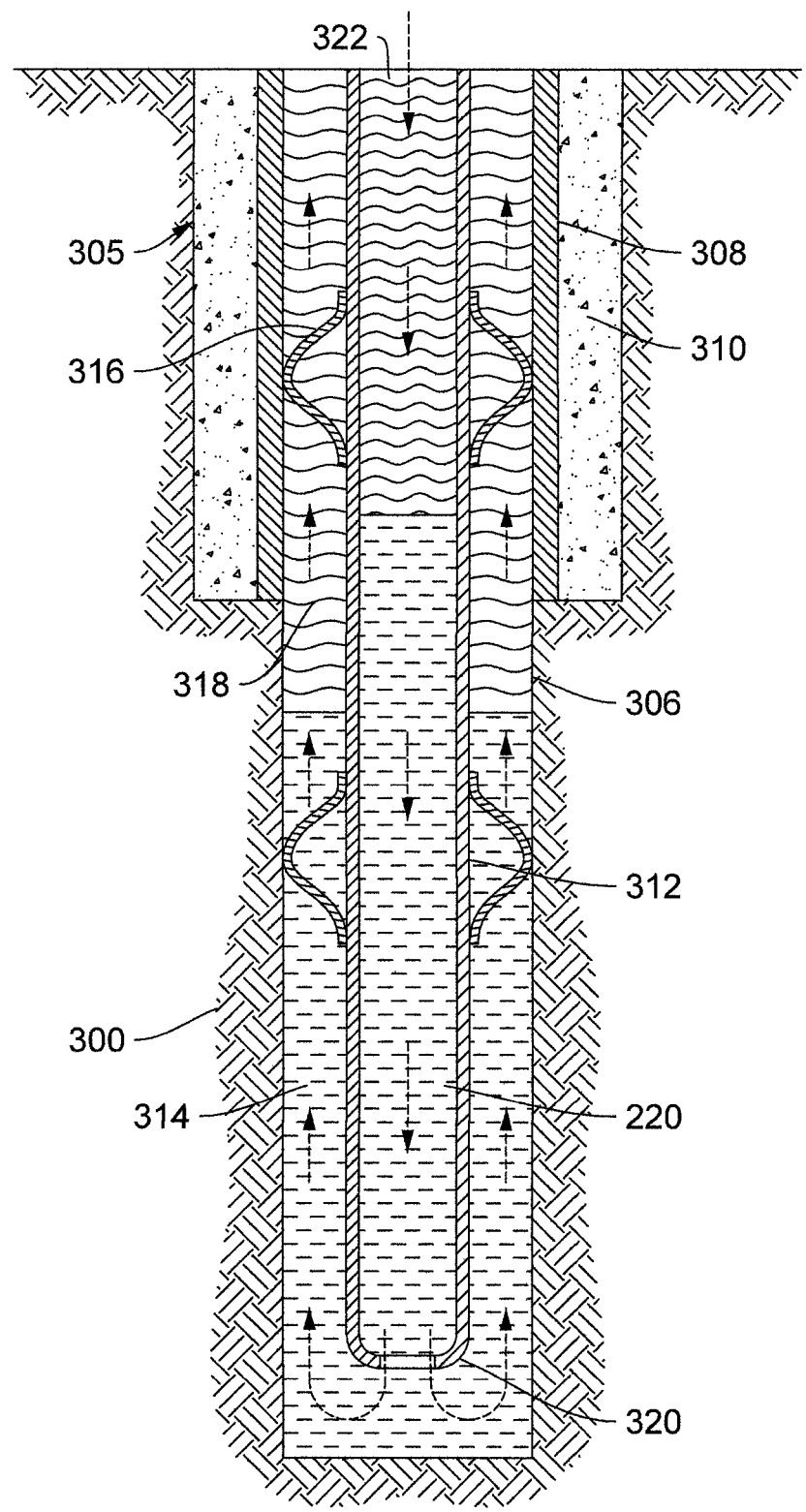
FIG. 3 is a schematic illustration of an example in which a resin treatment fluid is used to create a primary protective sheath.

FIG. 3 generally depicts the placement of resin treatment fluid 220 into a subterranean formation 300 in accordance with example examples. As illustrated, a wellbore 305 may be drilled into the subterranean formation 500. While wellbore 305 is shown extending generally vertically into the subterranean formation 300, the principles described herein are also applicable to wellbores that extend at an angle through the subterranean formation 300, such as horizontal and slanted wellbores. As illustrated, the wellbore 305 comprises walls 306. In the illustrated example, a surface casing 308 has been inserted into the wellbore 305. The surface casing 308 may be permanently or semi-permanently affixed and adhered to the wellbore 305 by a protective resin sheath 310. In alternative examples, surface casing 308 may be secured in the wellbore 305 by a hardened resin-cement composite sheath in place of protective resin sheath 310. In the illustrated example, one or more additional conduits (e.g., intermediate casing, production casing, liners, etc.), shown here as casing 312 may also be disposed in the wellbore 305. As illustrated, there is a wellbore annulus 314 formed between the casing 312 and the walls 306 of the wellbore 305 and/or the surface casing 308. One or more centralizers 316 may be attached to the casing 312, for example, to centralize the casing 312 in the wellbore 305 prior to and during the resin fluid treatment pumping operation.

With continued reference to FIG. 3, a first spacer fluid 318 may be pumped down the interior of the casing 312. The first spacer fluid 318 may be allowed to flow down the interior of the casing 312 through the casing shoe 320 at the bottom of the casing 312 and up around the casing 312 into the wellbore annulus 314. After the first spacer fluid 318 has been pumped into the casing 312, resin treatment fluid 220 may be pumped into the casing 312. In a manner similar to pumping the first spacer fluid 318, the resin treatment fluid 220 may be allowed to flow down the interior of the casing 312 through the casing shoe 320 at the bottom of the casing 312 and up around the casing 312 into the wellbore annulus 314. After the resin treatment fluid 220 has been pumped into the casing 312, a second spacer fluid 322 may be pumped into casing 312 and allowed to flow down the interior of the casing 312. The first spacer fluid 318 and the second spacer fluid 322 may be used to separate the resin treatment fluid 220 from fluids introduced into the wellbore 305 either in front of or behind the resin treatment fluid 220. Once the resin treatment fluid 220 has been placed into the desired position in the wellbore annulus 314, the resin treatment fluid 220 may be allowed to set in the wellbore annulus 314, for example, to form a hardened resin sheath that supports and positions the casing 312 in the wellbore 305. Alternatively, one or no spacer fluids may be used, and resin treatment fluid 220 may not need to be separated from other fluids introduced previously or subsequently into wellbore 305. While not illustrated, other techniques may also be utilized for introduction of the resin treatment fluid 220. By way of example, reverse circulation techniques may be used that include introducing the resin treatment fluid 220 into the subterranean formation 300 by way of the wellbore annulus 314 instead of through the casing 312. These techniques may also utilize a first spacer fluid 318 and a second spacer fluid 322, or they may utilize one or none spacer fluids. As it is introduced, the resin treatment fluid 220 may displace the first spacer fluid 318. At least a portion of the first spacer fluid 318 may exit the wellbore annulus 314 via a flow line 235 and be deposited, for example, in one or more mud pits 240, as shown on FIG. 2.

Figure 4:
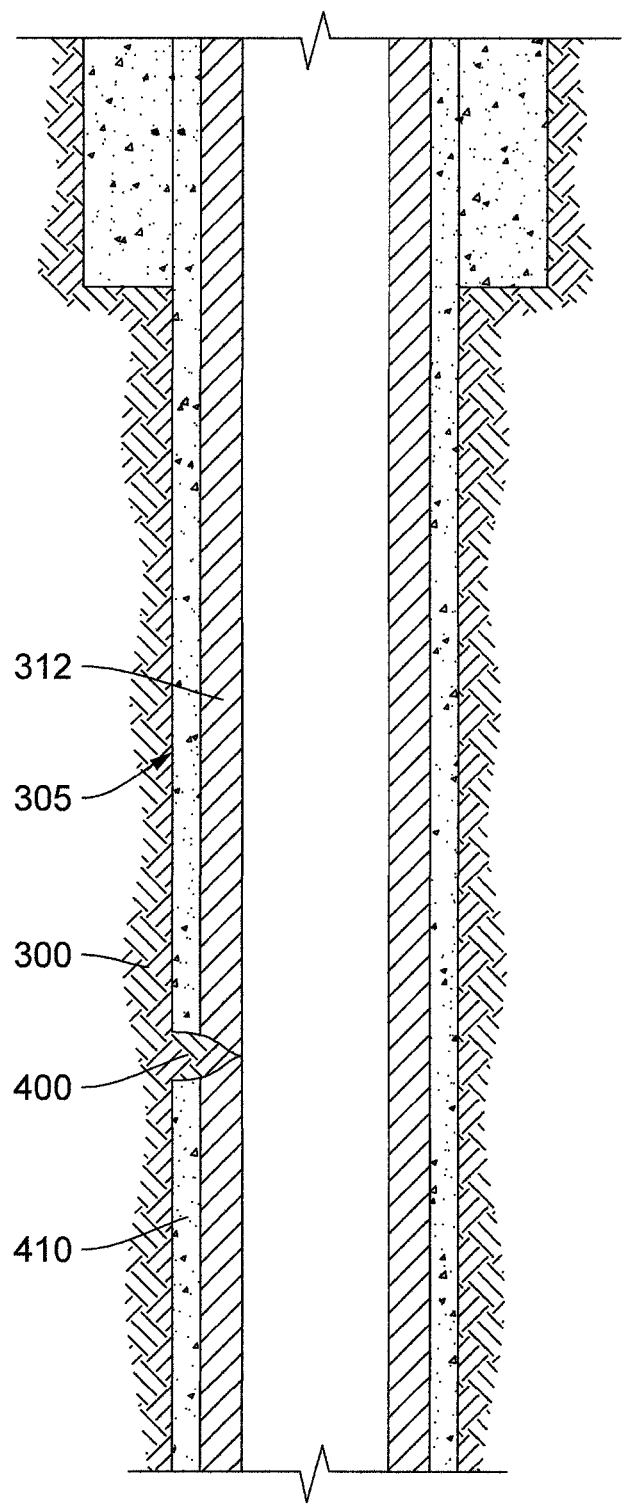
FIG. 4 is a schematic illustration showing the presence of a small perforation in a casing and protective sheath in a wellbore.
Figure 5:
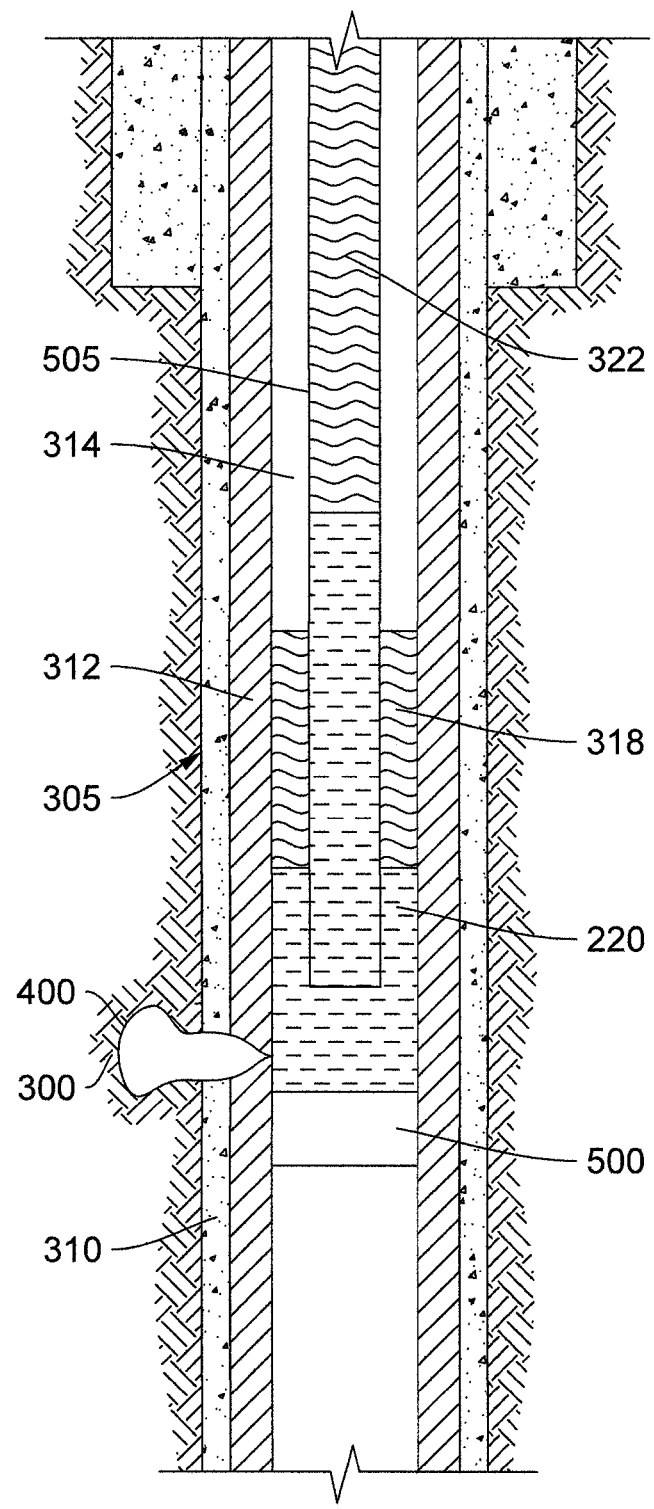
FIG. 5 is a schematic illustration of an example in which a resin treatment fluid is used in a remedial application.

FIGS. 4 and 5 illustrate methods of remedial or secondary cementing. Turning now to FIG. 4, there is shown a partial cross-section of a conventional producing wellbore 305 that has a primary cemented casing 312. The protective cement sheath 410 around the casing 312 may have defects potentially caused by a variety of issues, such as improper curing of the protective cement sheath 410 while it was being formed. Alternatively, the primary cementing may have been successful, but due to adverse temperatures and pressures within the subterranean formation 300, the casing 312 and/or the protective cement sheath 410 surrounding the casing 312 may form cracks or other types of small casing leaks 400. Small casing leaks 400 may be problematic since they may facilitate the introduction of undesirable fluids into the casing 312. As shown in FIG. 4, small casing leak 400 has formed in the protective cement sheath 410 and the casing 312, potentially allowing the introduction of undesirable fluids into the interior of the casing 312.

Referring now to FIG. 5, small casing leak 400 may be filled or plugged by a resin treatment fluid 220 or a resin-cement composite. A plug 500 (the plug 500 may be any type of plug, e.g., bridge plug, etc.) may be initially placed adjacent and below small casing leak 400, to form a barrier to prevent resin treatment fluid 220 from flowing down the wellbore 305 and therefore allow resin treatment fluid 220 of the present disclosure to fill small perforations 400 in the casing 312 and protective cement sheath 410. As shown in FIG. 5, tubing 505 (e.g., coiled tubing, drill pipe, etc.) may be lowered into wellbore 305. A first spacer fluid 318 may be pumped into the wellbore 305 via the tubing 505 and allowed to flow down the interior of the tubing 505 and into the blocked section of the wellbore 305 created by the plug 500. A portion of the first spacer fluid 318 may then flow through small casing leak 400 while another portion may reside in the wellbore annulus 314. After pumping the first spacer fluid 318 through the tubing 305, the resin treatment fluid 220 may be pumped through the tubing 505. The resin treatment fluid 220 may be pumped down the interior of the tubing 505 and into the blocked section of the wellbore 305 created by the plug 500. A portion of the resin treatment fluid 220 may then flow through small casing leak 400 while another portion may reside in the wellbore annulus 314. The resin treatment fluid 220 may be allowed to set in small casing leak 400 and in a portion of the wellbore annulus 314, for example, to form a hardened mass that seals small casing leak 400 to prevent the migration of undesirable fluids into the interior of the casing 312. After the resin treatment fluid 220 has been pumped into the tubing 505, a second spacer fluid 322 may be pumped into the tubing 505 and allowed to flow down the interior of the tubing 505 into the blocked section of the wellbore 305 created by the plug 500 and up around the tubing 505 into the wellbore annulus 314. Alternatively, one or no spacer fluids may be used, and resin treatment fluid 220 may not need to be separated from other fluids introduced previously or subsequently into wellbore 305. The tubing 505 may then be removed. The plug 500 may also be removed. In alternative examples, plug 500 may remain in the wellbore 305 and be drilled through. After tubing 305 is removed, the portion of the hardened resin treatment fluid 220 remaining in the wellbore 305 (i.e., the portion not in small casing leak 400) may then be drilled through.

Figure 6:
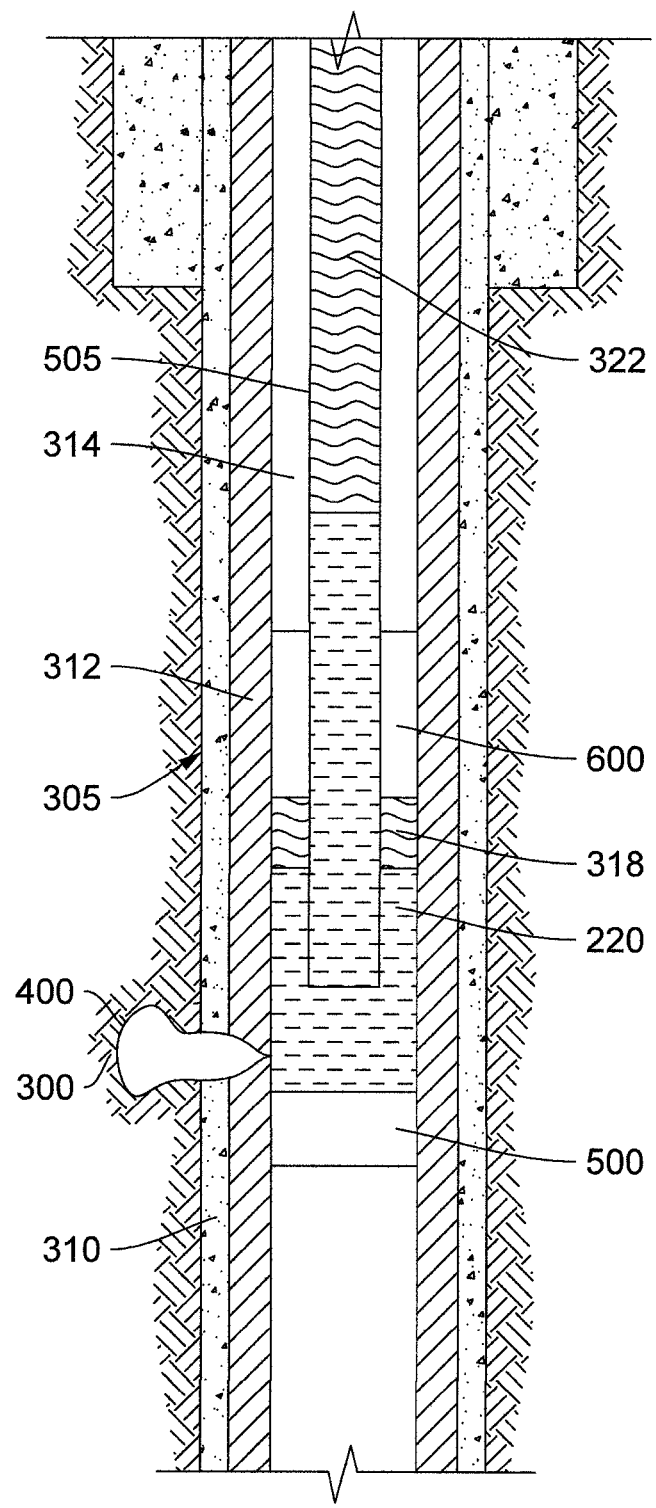
FIG. 6 is another schematic illustration of an example in which a resin treatment fluid is used in a remedial application.

FIG. 6 describes another example of filling casing leak 400 with a resin treatment fluid 220. A plug 500 (the plug 500 may be any type of plug, e.g., bridge plug, etc.) may be initially placed adjacent and below casing leak 400, to form a barrier that may allow pressurized pumping of a resin treatment fluid 220 of the present disclosure to fill any casing leak 400 in the casing 312 and protective cement sheath 310. As shown in FIG. 6, tubing 505 (e.g., coiled tubing, drill pipe, etc.) may be lowered into wellbore 305. Tubing 505 may be attached to a retainer 600 or may be inserted into a retainer 600 already placed into the wellbore 305. Retainer 600 may allow for the pressurized pumping of the resin treatment fluid 220 into any small casing leak 400. Retainer 600 must be placed adjacent to and above casing leak 400 to be filled by resin treatment fluid 220. Retainer 600 may be any type of retainer, for example, a cement retainer. After plug 500, tubing 505, and retainer 600 are placed, a first spacer fluid 318 may be pumped into the wellbore 305 via the tubing 505 and allowed to flow down the interior of the tubing 505 and into the blocked section of the wellbore 305 created by the plug 500. A portion of the first spacer fluid 318 may then flow through casing leak 400. After pumping the first spacer fluid 318 through the tubing 505, the resin treatment fluid 220 may be pumped through the tubing 505. The resin treatment fluid 220 may be pumped down the interior of the tubing 505 and into the blocked section of the wellbore 305 created by the plug 500. A portion of the resin treatment fluid 220 may then flow through casing leak 400 while another portion may reside in the space formed between the plug 500 and retainer 600. The resin treatment fluid 220 may be allowed to set in casing leak 400 and in the space formed between the plug 500 and retainer 600. The resin treatment fluid 220 may then harden to form a hardened mass that seals small casing leak 400 to prevent the migration of undesirable fluids into the interior of the casing 312. After the resin treatment fluid 220 has been pumped into the tubing 505, a second spacer fluid 322 may be pumped into the tubing 505 and allowed to flow down the interior of the tubing 505 into the blocked section of the wellbore 305 created by the plug 500 and into the space formed between the plug 500 and retainer 600. Alternatively, one or no spacer fluids may be used, and resin treatment fluid 220 may not need to be separated from other fluids introduced previously or subsequently into wellbore 305. The tubing 505 may then be removed. The plug 500 may also be removed. In alternative examples, plug 500 may remain in the wellbore 305 and be drilled through. Retainer 600 may also be removed. Conversely, in alternative examples, retainer 600 may be drilled through. After tubing 505 is removed, the portion of the hardened resin treatment fluid 220 remaining in the wellbore 305 (i.e., the portion not in the small casing leak 400) may then be drilled through.

The cementing compositions disclosed herein may directly or indirectly affect one or more components or pieces of equipment associated with the preparation, delivery, recapture, recycling, reuse, and/or disposal of the cementing compositions. For example, the cementing compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the cementing compositions. The cementing compositions may also directly or indirectly affect any transport or delivery equipment used to convey the cementing compositions to a well site or downhole such as, for example, any transport vessels, conduits, pipelines, trucks, tubulars, and/or pipes used to compositionally move the cementing compositions from one location to another, any pumps, compressors, or motors (e.g., topside or downhole) used to drive the fracturing fluid into motion, any valves or related joints used to regulate the pressure or flow rate of the cementing compositions, and any sensors (i.e., pressure and temperature), gauges, and/or combinations thereof, and the like. The disclosed cementing compositions may also directly or indirectly affect the various downhole equipment and tools that may come into contact with the cementing compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

The systems and methods may include any of the various features of the systems and methods disclosed herein, including one or more of the following statements.

Statement 1. A method comprising: introducing a resin treatment fluid into a wellbore, the resin treatment fluid comprising: a resin; a hardening agent; and a neutron contrasting agent; and allowing the resin treatment fluid to set to form a hardened mass.

Statement 2. The method of statement 1 wherein the resin comprises at least one liquid resin selected from the group consisting of epoxy-based resins, novolak resins, polyepoxide resins, phenol-aldehyde resins, urea-aldehyde resins, urethane resins, phenolic resins, furan resins, furan and furfuryl alcohol resins, phenolic/latex resins, phenol formaldehyde resins, bisphenol A diglycidyl ether resins, butoxymethyl butyl glycidyl ether resins, bisphenol A-epichlorohydrin resins, bisphenol F resins, diglycidyl ether bisphenol F resin, cyclohexane dimethanol diglycidyl ether, glycidyl ether resins, polyester resins and hybrids and copolymers thereof, polyurethane resins and hybrids and copolymers thereof, acrylate resins, and combinations thereof.

Statement 3. The method of any of statements 1-2 wherein the hardening agent comprises at least one hardening agent selected from the group consisting of aliphatic amines, aliphatic tertiary amines, aromatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, N-aminophenyl piperazine, imidazoline, 1,2-diaminocyclohexane, polyetheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and combinations thereof.

Statement 4. The method of any of statements 1-3 wherein the neutron contrasting agent comprises at least one solid selected from the group consisting of boron carbide, boron nitride, boric acid, borosilicate glass, zinc borate, borax, gadolinium, gadolinium oxide, gadolinium acetate, gadolinium concentrated glass, and combinations thereof.

Statement 5. The method of any of statements 1-4 wherein the neutron contrasting agent is present in an amount in the resin treatment fluid such that a difference in backscattered thermal neutrons before and after the resin treatment fluid is introduced into a well bore can be detected.

Statement 6. The method of any of statements 1-5 wherein the neutron contrasting agent is present in the resin treatment fluid in an amount ranging from about 0.0001% to about 1% by mass of the resin treatment fluid.

Statement 7. The method of any of statements 1-6 wherein the resin treatment fluid further comprises a rheological modifier selected from the group consisting of hydrophobic clay, bentonite, diatomaceous earth, gilsonite, scleroglucan; carragenans, xanthan, welan, diutan gums, celluloses, hydroxyl ethyl celluloses, acrylamide polymers, acrylic acid-acrylamide co-polymers, acrylamide co-polymers, and combinations thereof.

Statement 8 The method of any of statements 1-7 wherein the resin treatment fluid further comprises a cement selected from the group consisting of Portland cement, pozzolan cement, gypsum cement, high alumina content cement, slag cement, high magnesia content cement, shale cement, acid/base cement, fly ash cement, zeolite cement, kiln dust cement system, microtine cement, metakaolin cement, pumice/lime cement, and combinations thereof.

Statement 9. The method of any of statements 1-8 further comprising preparing the resin treatment fluid by mixing the resin, the hardening agent; and the neutron contrasting agent.

Statement 10. A method comprising: introducing a resin treatment fluid into a wellbore, the resin treatment fluid comprising: a resin comprising a cycloalkene; a transitional metal compound catalyst; a hardening agent; a neutron contrasting agent; and allowing the resin treatment fluid to set to form a hardened mass.

Statement 11. The method of statement 10, wherein the cycloalkene is selected from the group consisting of cyclopentadiene, dicyclopentadiene, tricyclopentadiene, cyclobutadiene, cyclobutadiene derivatives, cyclohexadiene, terpinene, norbornadiene, isomers thereof, and combinations thereof.

Statement 12. The method of any of statements 10-11, wherein the transition metal compound catalyst comprises a catalyst having a structure selected from the group consisting of:

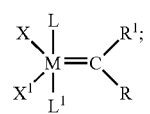

Structure 1

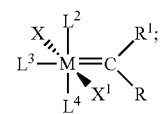

Structure 2

-continued

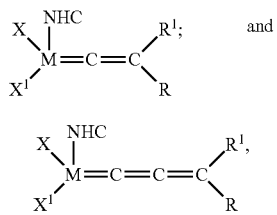

Structure 3

Structure 4 where M is ruthenium or osmium, R and R1 are independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl, X and X1 are each an anionic ligand, L and L1 are each a neutral electron donor, and NHC is an N-heterocyclic carbene ligand.

Statement 13. The method of statement 12, wherein R and R1 are each substituted with a C1-C5 alkyl group, a halogen, a C1-C5 alkoxy group or a phenyl group, wherein the phenyl group is further unsubstituted or substituted with a C1-C5 alkyl group, a halogen, or a C1-C5 alkoxy group.

Statement 14. The method of any of statements 10-13, wherein the cycloalkene is present in an amount of about 50 wt. % to about 99.5 wt. % of the resin treatment fluid.

Statement 15. The method of any of statements 10-14, wherein the transition metal compound catalyst is present in an amount of about 0.001 wt. % to about 2 wt. % of the resin treatment fluid.

Statement 16. The method of any of statements 10-15 wherein the neutron contrasting agent comprises at least one solid selected from the group consisting of boron carbide, boron nitride, boric acid, borosilicate glass, zinc borate, borax, gadolinium, gadolinium oxide, gadolinium acetate, gadolinium concentrated glass, and combinations thereof.

Statement 17. A method comprising: introducing a resin treatment fluid into a wellbore, the resin treatment fluid comprising: a resin; a hardening agent; and a neutron contrasting agent selected from the group consisting of boron carbide, boron nitride, boric acid, borosilicate glass, zinc borate, borax, gadolinium, gadolinium oxide, gadolinium acetate, gadolinium concentrated glass, and combinations thereof; and allowing the resin treatment fluid to set to form a hardened mass.

Statement 18. The method of statement 17 further comprising introducing a neutron logging tool into the wellbore and detecting the neutron contrasting agent using the neutron logging tool.

Statement 19. The method of statement 18 further comprising generating a cement bond log indicating placement of the resin treatment fluid.

Statement 20. The method of any of statement 17-19 wherein the neutron contrasting agent neutron contrasting agent is present in an amount in the resin treatment fluid such that a difference in backscattered thermal neutrons before and after the resin treatment fluid is introduced into a well bore can be detected.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:
1. A method comprising:
   introducing a resin treatment fluid into a wellbore, the resin treatment fluid comprising:
      a resin;
      a hardening agent; and
      a neutron contrasting agent;
   setting the resin treatment fluid to form a hardened mass;
   introducing a neutron logging tool into the wellbore;
   detecting the neutron contrasting agent using the neutron logging tool; and
   generating a cement bond log indicating placement of the resin treatment fluid.
2. The method of claim 1 wherein the resin comprises at least one liquid resin selected from the group consisting of epoxy-based resins, novolak resins, polyepoxide resins, phenol-aldehyde resins, urea-aldehyde resins, urethane resins, phenolic resins, furan resins, furan and furfuryl alcohol resins, phenolic/latex resins, phenol formaldehyde resins, bisphenol A diglycidyl ether resins, butoxymethyl butyl glycidyl ether resins, bisphenol A-epichlorohydrin resins, bisphenol F resins, diglycidyl ether bisphenol F resin, cyclohexane dimethanol diglycidyl ether, glycidyl ether resins, polyester resins and hybrids and copolymers thereof, polyurethane resins and hybrids and copolymers thereof, acrylate resins, and combinations thereof.

3. The method of claim 1 wherein the hardening agent comprises at least one hardening agent selected from the group consisting of aliphatic amines, aliphatic tertiary amines, aromatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, N-aminophenyl piperazine, imidazoline, 1,2-diaminocyclohexane, polyetheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and combinations thereof.

4. The method of claim 1 wherein the neutron contrasting agent is present in an amount in the resin treatment fluid such that a difference in backscattered thermal neutrons before and after the resin treatment fluid is introduced into a well bore can be detected.

5. The method of claim 1 wherein the neutron contrasting agent is present in the resin treatment fluid in an amount ranging from about 0.0001% to about 1% by mass of the resin treatment fluid.

6. The method of claim 1 wherein the resin treatment fluid further comprises a rheological modifier selected from the group consisting of hydrophobic clay, bentonite, diatomaceous earth, gilsonite, scleroglucan, carragenans, xanthan, welan, diutan gums, celluloses, hydroxyl ethyl celluloses, acrylamide polymers, acrylic acid-acrylamide co-polymers, acrylamide co-polymers, and combinations thereof.

7. The method of claim 1 wherein the resin treatment fluid further comprises a cement selected from the group consisting of Portland cement, pozzolan cement, gypsum cement, high alumina content cement, slag cement, high magnesia content cement, shale cement, acid/base cement, fly ash cement, zeolite cement, kiln dust cement system, microfine cement, metakaolin cement, pumice/lime cement, and combinations thereof.

8. The method of claim 1 further comprising preparing the resin treatment fluid by mixing the resin, the hardening agent and the neutron contrasting agent.

9. A method comprising:
introducing a resin treatment fluid into a wellbore, the resin treatment fluid comprising:
a resin comprising a cycloalkene;
a transitional metal compound catalyst;
a hardening agent;
a neutron contrasting agent;
setting the resin treatment fluid to form a hardened mass;
introducing a neutron logging tool into the wellbore;
detecting the neutron contrasting agent using the neutron logging tool; and
generating a cement bond log indicating placement of the resin treatment fluid.

10. The method of claim 9, wherein the cycloalkene is selected from the group consisting of cyclopentadiene, dicyclopentadiene, tricyclopentadiene, cyclobutadiene, cyclobutadiene derivatives, cyclohexadiene, terpinene, norbornadiene, isomers thereof, and combinations thereof.

11. The method of claim 9, wherein the transition metal compound catalyst comprises a catalyst having a structure selected from the group consisting of:

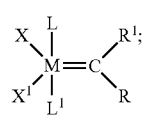

Structure 1

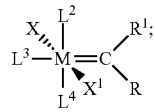

Structure 2

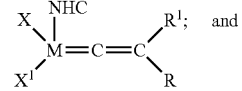

Structure 3

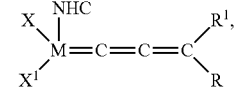

Structure 4 where M is ruthenium or osmium, R and R1 are independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl, X and X1 are each an anionic ligand, L and L1 are each a neutral electron donor, and NHC is an N-heterocyclic carbene ligand.

12. The method of claim 9, wherein the cycloalkene is present in an amount of about 50 wt. % to about 99.5 wt. % of the resin treatment fluid.

13. The method of claim 9, wherein the transition metal compound catalyst is present in an amount of about 0.001 wt. % to about 2 wt. % of the resin treatment fluid.

14. The method of claim 9 wherein the neutron contrasting agent comprises at least one solid selected from the group consisting of boron carbide, boron nitride, boric acid, borosilicate glass, zinc borate, borax, gadolinium, gadolinium oxide, gadolinium acetate, gadolinium concentrated glass, and combinations thereof.

15. The method of claim 9 wherein the neutron contrasting agent is present in the resin treatment fluid in an amount ranging from about 0.0001% to about 1% by mass of the resin treatment fluid.

16. A method comprising:
introducing a resin treatment fluid into a wellbore, the resin treatment fluid comprising:
a resin;
a hardening agent; and
a neutron contrasting agent selected from the group consisting of boron carbide, boron nitride, boric acid, borosilicate glass, zinc borate, borax, gadolinium, gadolinium oxide, gadolinium acetate, gadolinium concentrated glass, and combinations thereof:
setting the resin treatment fluid to form a hardened mass;
introducing a neutron logging tool into the wellbore;
detecting the neutron contrasting agent using the neutron logging tool; and
generating a cement bond log indicating placement of the resin treatment fluid.

17. The method of claim 16 wherein the neutron contrasting agent neutron contrasting agent is present in an amount in the resin treatment fluid such that a difference in backscattered thermal neutrons before and after the resin treatment fluid is introduced into a well bore can be detected.

18. The method of claim 16 wherein the resin comprises at least one liquid resin selected from the group consisting of epoxy-based resins, novolak resins, polyepoxide resins, phenol-aldehyde resins, urea-aldehyde resins, urethane resins, phenolic resins, furan resins, furan and furfuryl alcohol resins, phenolic/latex resins, phenol formaldehyde resins, bisphenol A diglycidyl ether resins, butoxymethyl butyl glycidyl ether resins, bisphenol A-epichlorohydrin resins, bisphenol F resins, diglycidyl ether bisphenol F resin, cyclohexane dimethanol diglycidyl ether, glycidyl ether resins, polyester resins and hybrids and copolymers thereof, polyurethane resins and hybrids and copolymers thereof, acrylate resins, and combinations thereof.

19. The method of claim 16 wherein the hardening agent comprises at least one hardening agent selected from the group consisting of aliphatic amines, aliphatic tertiary amines, aromatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, N-aminophenyl piperazine, imidazoline, 1,2-diaminocyclohexane, polyetheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and combinations thereof.

20. The method of claim 16 wherein the resin treatment fluid further comprises a rheological modifier selected from the group consisting of hydrophobic clay, bentonite, diatomaceous earth, gilsonite, scleroglucan, carragenans, xanthan, welan, diutan gums, celluloses, hydroxyl ethyl celluloses, acrylamide polymers, acrylic acid-acrylamide co-polymers, acrylamide co-polymers, and combinations thereof.

* * * * *